US011155501B2

(12) United States Patent
Hama et al.

(10) Patent No.: US 11,155,501 B2
(45) Date of Patent: Oct. 26, 2021

(54) SINTERED MATERIAL AND PARTIALLY STABILIZED ZIRCONIA WITH SOLID SOLUTION OF ALUMINA FORMED THEREIN

(71) Applicants: Sumitomo Electric Industries, Ltd., Osaka (JP); Sumitomo Electric Hardmetal Corp., Itami (JP)

(72) Inventors: Hisaya Hama, Osaka (JP); Katsumi Okamura, Osaka (JP); Mayu Amemiya, Osaka (JP); Satoru Kukino, Itami (JP)

(73) Assignees: SUMITOMO ELECTRIC INDUSTRIES, LTD., Osaka (JP); SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 17/253,123

(22) PCT Filed: Feb. 22, 2019

(86) PCT No.: PCT/JP2019/006759
§ 371 (c)(1),
(2) Date: Dec. 17, 2020

(87) PCT Pub. No.: WO2019/244398
PCT Pub. Date: Dec. 26, 2019

(65) Prior Publication Data
US 2021/0253483 A1    Aug. 19, 2021

(30) Foreign Application Priority Data
Jun. 18, 2018 (JP) .............. JP2018-115483

(51) Int. Cl.
C04B 35/5831 (2006.01)
C04B 35/488 (2006.01)
B32B 27/14 (2006.01)
B32B 27/20 (2006.01)

(52) U.S. Cl.
CPC .......... *C04B 35/5831* (2013.01); *B32B 27/14* (2013.01); *B32B 27/20* (2013.01); *C04B 35/488* (2013.01); *C04B 2235/3217* (2013.01); *C04B 2235/3246* (2013.01)

(58) Field of Classification Search
CPC .............. C04B 35/5831; C04B 35/488; C04B 2235/3217; C04B 2235/3246; B32B 27/20; B32B 27/14
See application file for complete search history.

(56) References Cited

U.S. PATENT DOCUMENTS

| 2012/0329632 A1* | 12/2012 | Malik ................. C04B 35/645 501/87 |
| 2017/0233295 A1 | 8/2017 | Ishii et al. |
| 2019/0240739 A1 | 8/2019 | Ishii et al. |

FOREIGN PATENT DOCUMENTS

| EP | 371211 A2 | 6/1990 |
| JP | 59-45969 A | 3/1984 |
| JP | 2011-228407 A | 11/2011 |
| WO | 2016/171155 A1 | 10/2016 |
| WO | 2018/074017 A1 | 4/2018 |

OTHER PUBLICATIONS

Written Opinion dated May 7, 2019, received for PCT Application PCT/JP2019/006759, Filed on Feb. 22, 2019, 4 pages, with English Translation.
Notice of Reasons for Refusal dated Feb. 12, 2020, received for JP Application 2019-571551, 6 pages with English Translation.
Decision to Grant dated Jun. 30, 2020, received for JP Application 2019-571551, 5 pages with English Translation.
Yano et al., "Effects of Spray Pyrolysis Conditions of Character of Yttria Partially Stabilized Zirconia Powders", vol. 95, No. 1, 1987, pp. 121-126.
Kato, "Preparation of Fine Particles by Solution Technique", Resources Processing, vol. 37, No. 2, 1990, pp. 70-74.

* cited by examiner

*Primary Examiner* — Jonathan C Langman
(74) *Attorney, Agent, or Firm* — Xsensus LLP

(57) ABSTRACT

A sintered material comprises cubic boron nitride and a first material that is a partially stabilized $ZrO_2$ with $Al_2O_3$ dispersed therein at crystal grain boundaries and/or in crystal grains, the sintered material comprising 20% by volume or more and 80% by volume or less of the cubic boron nitride, the sintered material comprising 0.001% by mass or more and 1% by mass or less of nitrogen in the first material when the first material is measured through secondary ion mass spectrometry.

3 Claims, No Drawings

SINTERED MATERIAL AND PARTIALLY STABILIZED ZIRCONIA WITH SOLID SOLUTION OF ALUMINA FORMED THEREIN

CROSS-REFERENCE TO RELATED APPLICATIONS

The present application is based on PCT filing PCT/JP2019/006759, filed Feb. 22, 2019, which claims priority to Japanese Patent Applications No. 2018-115483, filed on Jun. 18, 2018, the entire contents of each are incorporated herein by reference.

TECHNICAL FIELD

The present disclosure relates to a sintered material and partially stabilized zirconia with a solid solution of alumina formed therein.

BACKGROUND ART

International Publication No. 2016/171155 (PTL 1) discloses a sintered material comprising cubic boron nitride (hereinafter also referred to as "cBN") and partially stabilized zirconia (partially stabilized $ZrO_2$) with $Al_2O_3$ dispersed therein at crystal grain boundaries and/or in crystal grains. When applied to a cutting tool, the sintered material shows excellent characteristics in breaking resistance in high-speed cutting.

CITATION LIST

Patent Literature

PTL 1: WO2016/171155

SUMMARY OF INVENTION

According to an aspect of the present disclosure a sintered material is a sintered material comprising cubic boron nitride and a first material that is a partially stabilized $ZrO_2$ with $Al_2O_3$ dispersed therein at crystal grain boundaries and/or in crystal grains, the sintered material comprising 20% by volume or more and 80% by volume or less of the cubic boron nitride, the sintered material comprising 0.001% by mass or more and 1% by mass or less of nitrogen in the first material when the first material is measured through secondary ion mass spectrometry.

According to an aspect of the present disclosure, a partially stabilized zirconia with a solid solution of alumina formed therein is a partially stabilized $ZrO_2$ with a solid solution of $Al_2O_3$ formed therein, comprising 5 atomic % or more and 90 atomic % or less of Al as measured through emission spectroscopy using inductively coupled plasma as a light source, and comprising 0.001% by mass or more and 0.5% by mass or less of nitrogen as measured through inert gas fusion.

DETAILED DESCRIPTION

Problem to be Solved by the Present Disclosure

In the field of art relevant to cutting tools, however, there is a case where it is required to cut a difficult-to-cut material such as centrifugal cast iron under severer conditions in terms of cutting speed and the like. In that case, a sintered material tends to be required to have larger breaking resistance. Therefore, there has been a case where the sintered material disclosed in PTL 1 has been required to have larger breaking resistance.

The present disclosure has been made in view of the above circumstances, and it is an object of the present disclosure to provide a sintered material having large breaking resistance to enable cutting under severer conditions, and partially stabilized zirconia with a solid solution of alumina formed therein that serves as a raw material therefor.

Advantageous Effect of the Present Disclosure

According to the above, there can be provided a sintered material having large breaking resistance to enable cutting under severer conditions, and partially stabilized zirconia with a solid solution of alumina formed therein that serves as a raw material therefor.

Description of Embodiments of the Present Disclosure

While conducting an investigation for a sintered material that enables cutting under severe conditions, the present inventors have found that a sintered material obtained by sintering a raw material including cBN and partially stabilized zirconia with a solid solution of alumina formed therein that has a nitrogen content controlled to fall within a prescribed range exhibits large fracture toughness. As a result, the present inventors have accomplished a sintered material and partially stabilized zirconia with a solid solution of alumina formed therein according to the present disclosure.

Initially, embodiments of the present disclosure will be listed and described.

[1] According to an aspect of the present disclosure, a sintered material is a sintered material comprising cubic boron nitride and a first material that is a partially stabilized $ZrO_2$ with $Al_2O_3$ dispersed therein at crystal grain boundaries and/or in crystal grains, the sintered material comprising 20% by volume or more and 80% by volume or less of the cubic boron nitride, the sintered material comprising 0.001% by mass or more and 1% by mass or less of nitrogen in the first material when the first material is measured through secondary ion mass spectrometry. Such a sintered material can obtain large breaking resistance and thus be used for cutting a difficult-to-cut material under severe conditions.

[2] When the first material is measured through secondary ion mass spectrometry, the sintered material preferably comprises 0.005% by mass or more and 0.3% by mass or less of nitrogen in the first material. As a result, the sintered material can obtain larger breaking resistance, and thus suitably be used for cutting a difficult-to-cut material under severe conditions.

[3] When the first material is measured through secondary ion mass spectrometry, the sintered material preferably comprises 0.01% by mass or more and 0.1% by mass or less of nitrogen in the first material. As a result, the sintered material can obtain further larger breaking resistance, and thus more suitably be used for cutting a difficult-to-cut material under severe conditions.

[4] According to one aspect of the present disclosure, a partially stabilized zirconia with a solid solution of alumina formed therein is a partially stabilized $ZrO_2$ with a solid solution of $Al_2O_3$ formed therein, comprising 5 atomic % or more and 90 atomic % or less of Al as measured through emission spectroscopy using inductively coupled plasma as a light source, and comprising 0.001% by mass or more and 0.5% by mass or less of nitrogen as measured through inert gas fusion. When such a partially stabilized zirconia with a solid solution of alumina formed therein is used as a raw material for a sintered material, the sintered material can have enhanced breaking resistance.

[5] Preferably, the partially stabilized zirconia with a solid solution of alumina formed therein comprises 0.003% by mass or more and 0.1% by mass or less of nitrogen as measured through inert gas fusion. The sintered material can have further enhanced breaking resistance.

[6] Preferably, the partially stabilized zirconia with a solid solution of alumina formed therein comprises 0.005% by mass or more and 0.06% by mass or less of nitrogen as measured through inert gas fusion. The sintered material can have further enhanced breaking resistance.

Detailed Description of Embodiments of the Present Disclosure

Hereinafter, while an embodiment of the present disclosure (hereinafter also referred to as "the present embodiment") will be described in more detail, the present embodiment is not exclusive.

In the present specification, an expression in the form of "A to B" means a range's upper and lower limits (that is, A or more and B or less), and when A is not accompanied by any unit and B is alone accompanied by a unit, A has the same unit as B. Furthermore, in the present specification, when a compound or the like is represented by a chemical formula without specifying any specific atomic ratio, it shall include any conventionally known atomic ratio and is not necessarily limited to what falls within the stoichiometric range. For example, for "AlN," the ratio of the number of atoms constituting AlN is not limited to Al:N=1:1, and includes any conventionally known atomic ratio. This also applies to descriptions for compounds other than "AlN."

<<Sintered Material>>

According to the present embodiment, a sintered material includes cubic boron nitride, and a first material that is a partially stabilized $ZrO_2$ with $Al_2O_3$ dispersed therein at crystal grain boundaries and/or in crystal grains. The sintered material includes 20% by volume or more and 80% by volume or less of cubic boron nitride. Further, when the first material is measured through secondary ion mass spectrometry, the sintered material includes 0.001% by mass or more and 1% by mass or less of nitrogen in the first material. Such a sintered material can obtain large breaking resistance, and thus suitably be used for cutting a difficult-to-cut material under severe conditions.

<Cubic Boron Nitride>

A sintered material according to the present embodiment includes cubic boron nitride, as has been described above. Preferably, the cubic boron nitride is present as grains (crystal grains) in the sintered material and has an average grain diameter of 0.1 to 5 μm. When the cubic boron nitride has an average grain diameter of less than 0.1 μm, it tends to coagulate when it is mixed with another raw material, and thus tends to invite insufficient sintering. When the cubic boron nitride has an average grain diameter exceeding 5 μm, it tends to reduce strength due to grain growth when it is sintered.

The cubic boron nitride preferably has a uniform grain diameter as it is free of stress concentration and provides large strength. Further, the cubic boron nitride preferably has a grain diameter exhibiting a normal distribution. It is also preferable that the cubic boron nitride has a grain diameter exhibiting a bimodal grain diameter distribution.

The sintered material includes 20% by volume or more and 80% by volume or less of cubic boron nitride. When the cubic boron nitride is contained in an amount of less than 20% by volume, it may reduce hardness and hence wear resistance. When the cubic boron nitride is contained in an amount exceeding 80% by volume, the first material will be contained in a small amount, and it will be difficult to obtain characteristics based on the first material. The cubic boron nitride is preferably contained in an amount of 40 to 60% by volume.

The cubic boron nitride's average grain diameter and content (in % by volume) can be determined in the following measurement method: That is, an argon ion beam is used to subject the sintered material to CP (Cross Section Polisher) processing to obtain a sample having a smooth cross section. The cross section of the sample is observed with a scanning electron microscope (SEM) (trade name (model number): "JSM-7800F" produced by JEOL Ltd.) at a high magnification of 10,000 times to identify grains of cubic boron nitride in a field of view. Subsequently, all of the grains of cubic boron nitride in the field of view are binarized using image analysis software (trade name: "WinRooF ver. 6.5.3" available from MITANI CORPORATION) to calculate their equivalent circular diameters and their total area, and an average value of the equivalent circular diameters is defined as an average grain diameter and the total area is defined as a content.

Herein, in the present specification, the total area of cubic boron nitride obtained from the cross section can be considered to continue in the direction of the depth of the sintered material to be represented as a cubic boron nitride content in % by volume. The average grain diameter and content of cubic boron nitride in the sintered material are preferably determined as follows: from the above cross section, SEM images captured in three or more fields of view are prepared and subjected to the above-described image analysis to obtain measured values, which are in turn averaged to provide the average grain diameter and content of cubic boron nitride in the sintered material.

<First Material>

According to the present embodiment, a sintered material includes a first material that is a partially stabilized $ZrO_2$ with $Al_2O_3$ dispersed therein at crystal grain boundaries and/or in crystal grains, as has been discussed above. Partially stabilized $ZrO_2$ has a conventional meaning, and typically refers to $ZrO_2$ which has its crystal structure of a cubic crystal structure and a tetragonal crystal structure also stable or metastable even at room temperature by causing an oxide other than zirconia to form a solid solution to reduce oxygen vacancies in the structure. Examples of the oxide can include calcium oxide, magnesium oxide, and a rare earth oxide such as yttrium oxide. The partially stabilized $ZrO_2$ can include one or more of the above oxides. An oxide other than zirconia preferably forms a solid solution in an amount of about 1 to 4% by mol with respect to $ZrO_2$.

$Al_2O_3$ is dispersed in the partially stabilized $ZrO_2$ at crystal grain boundaries and/or in crystal grains and thus present therein. Being "dispersed and present" means that small grains of $Al_2O_3$ are present somewhere in the partially stabilized $ZrO_2$ at grain boundaries and/or in crystal grains. That is, it means that where $Al_2O_3$ is present is not limited to any specific location in the partially stabilized $ZrO_2$.

$Al_2O_3$ is preferably included in an amount of 5 to 90% by volume with respect to the partially stabilized $ZrO_2$. More preferably, $Al_2O_3$ is included in an amount of 5 to 50% by volume with respect to the partially stabilized $ZrO_2$. Thus, the sintered material has characteristics of large hardness, large strength and large fracture toughness, and thus enables high-speed cutting of a difficult-to-cut material. When $Al_2O_3$ exceeds 90% by volume with respect to the partially stabilized $ZrO_2$, the sintered material tends to have reduced breaking resistance. When $Al_2O_3$ is less than 5% by volume with respect to the partially stabilized $ZrO_2$, the sintered material tends to no longer exhibit characteristics of large hardness, large strength and large fracture toughness based on the first material as described above.

$Al_2O_3$ is preferably grains (crystal grains) of 1 μm or less, more preferably 0.5 μm or less, most preferably 0.1 μm or less. When $Al_2O_3$ has smaller grain diameters it tends to enhance the first material in fracture toughness, and accordingly. $Al_2O_3$ has a grain diameter without any specific lower limit set therefor. However, when $Al_2O_3$ is extremely small grains, it tends to reduce fracture toughness of the substance per se, and accordingly. $Al_2O_3$ preferably has a grain diameter of 0.005 μm or more. When $Al_2O_3$ is dispersed in the first material and thus present therein, it allows fracture toughness to be dramatically enhanced, and it is believed that this is because $Al_2O_3$ make a structure tough.

The $Al_2O_3$'s grain diameter and content (in % by volume) can be determined in the same method as the method used to determine the cubic boron nitride's grain diameter and content (in % by volume), as has been described above. That is, an argon ion beam is used to subject the sintered material to CP processing to obtain a sample having a smooth cross section, which is in turn observed with the above scanning electron microscope at a magnification of 10,000 times and binarized using the above image analysis software to calculate the $Al_2O_3$'s equivalent circular diameter and define it as its grain diameter. Further, the $Al_2O_3$'s area calculated through the binarization process using the image analysis software can be determined as its content (in % by volume).

The first material's grain diameter and content (in % by volume) can also be determined in the same method as the method used to determine the cubic boron nitride's grain diameter and content (in % by volume).

The first material is preferably contained in the sintered material in an amount of 20 to 80% by volume. When the first material is contained in an amount of less than 20% by volume, the sintered material tends to have reduced wear resistance and reduced breaking resistance. When the first material is contained in an amount exceeding 80% by volume, the sintered material tends to have reduced wear resistance. The first material is more preferably contained in an amount of 40 to 60% by volume.

<Nitrogen Content in the First Material>

When the sintered material has the first material measured through secondary ion mass spectrometry (SIMS), the sintered material comprises 0.001% by mass or more and 1% by mass or less of nitrogen in the first material. The first material having a nitrogen content controlled to be small to fall within the above range can be obtained by using partially stabilized zirconia with a solid solution of alumina formed therein that is produced through spray pyrolysis, as will be described hereinafter (hereinafter also referred to as "a precursor for the first material") as a raw material for obtaining the first material. Specifically, the first material can be obtained as follows: initially, partially stabilized zirconia with a solid solution of alumina formed therein is produced through spray pyrolysis, which will be described hereinafter, and the produced, partially stabilized zirconia with a solid solution of alumina formed therein is sintered together with cubic boron nitride in the step of obtaining a sintered material, as will be described hereinafter. This is because the partially stabilized zirconia with a solid solution of alumina formed therein is sintered to be partially stabilized $ZrO_2$ having $Al_2O_3$ dispersed therein at crystal grain boundaries and/or in crystal grains.

Nitrogen is present as an interstitial solid solution in the form of nitrogen atoms in the structure of the partially stabilized $ZrO_2$ serving as the first material. Therefore, by measuring the first material through secondary ion mass spectrometry, nitrogen in the form of atoms present in the first material will be detected. The sintered material preferably includes 0.005% by mass or more and 0.3% by mass or less of nitrogen in the first material, as measured through secondary ion mass spectrometry. Further, the sintered material more preferably includes 0.01% by mass or more and 0.1% by mass or less of nitrogen in the first material, as measured through secondary ion mass spectrometry. When the first material contains nitrogen in an amount exceeding 1% by mass, the partially stabilized $ZrO_2$ has many oxygen vacancies, and the sintered material tends to have large strain due to the first material. This tends to decrease the fracture toughness of the sintered material. When the first material contains nitrogen in an amount of less than 0.001% by mass, and it is sintered, excessive grain growth of $Al_2O_3$ occurs in $ZrO_2$, and the sintered material has reduced fracture toughness and thus tends to have insufficiently enhanced breaking resistance.

When secondary ion mass spectrometry (SIMS) is employed to measure a nitrogen content (% by mass) in the first material, a measurement instrument is used under conditions, as indicated below. When the nitrogen content is measured, it is preferable to sufficiently sputter adsorbed nitrogen to be measured, in a measurement chamber of the measurement instrument.

Measurement instrument: trade name (product number) "Nano-SIMS50L" produced by AMETEK CAMECA Primary ion species: cesium (Cs)

Aperture slit (D1): #2 and #3

Es slit: #3.

Further, the first material served in measuring the nitrogen content (% by mass) is selected as follows: That is, a sintered material is subjected to CP processing to obtain a sample having a cross section, as described above, which is in turn observed with the above measurement instrument ("Nano-SIMS50L") in a field of view of 100 μm×100 μm to observe the first material's grains, and therefrom the grains having the largest, second largest and third largest areas are extracted. For each of these grains, a distance from an end thereof to an end thereof is measured, and a center between two points which provide a largest distance therebetween is set as a SIMS measurement position.

In SIMS, a nitrogen content (% by mass) in a region of 500 nm square with this measurement position serving as a center, is measured. Based on this measurement, the grains of the first material in the field of view that have the largest, second largest and third largest areas have their nitrogen contents determined and these measured values' average is defined as a nitrogen content in the first material. Preferably the first material's nitrogen content is also determined in the same manner as when a cubic boron nitride content is determined, as described above, that is, SEM images of three fields of view are prepared from the above cross section and a nitrogen content is determined for each SEM image, and an average of the nitrogen contents is defined as a nitrogen content in the first material.

<Binder>

The sintered material according to the present embodiment preferably further comprises a binder together with the cBN and the first material. Specifically, the binder is preferably one or more compounds composed of at least one element selected from the group consisting of a Group 4 element (Ti, Zr, Hf, etc.), a Group 5 element (V, Nb, Ta, etc.), a Group 6 element (Cr, Mo, W, etc.) of the periodic table, Al and Si, and at least one element selected from the group consisting of carbon, nitrogen and oxygen. Including such a binder can further enhance the fracture toughness of the sintered material.

The binder can for example be at least one type of compound selected from the group consisting of $Al_2O_3$, $ZrO_2$, ZrO, MgO, SeO, $Y_2O_3$, HfO, TiC, TiN, $TiB_2$, TiCrN, ZrC, ZrN, $ZrB_2$, AlCrN, AlN, AlON, $AlB_2$, SiC, $Si_3N_4$, HfC, HfN, VC, VN, NbC, TaC, CrC, CrN, $Cr_2N$, MoC and WC. The binder can be composed of one type of the compounds alone or a combination of two or more types thereof. Herein, $Al_2O_3$, $ZrO_2$, and ZrO indicated as an example of the binder included in the sintered material mean $Al_2O_3$, $ZrO_2$ and ZrO derived from a raw material for the first material (partially stabilized zirconia with a solid solution of alumina formed therein, as will be described hereinafter), or $Al_2O_3$ added together with cBN and the raw material for the first material.

The binder preferably has an average particle diameter of 0.05 to 5 μm. When the binder has an average particle diameter of less than 0.05 μm, and the binder is mixed with another powder, it easily coagulate, which tends to result in poor sintering. When the binder has an average particle diameter exceeding 5 μm, it tends to reduce strength due to grain growth when it is sintered.

The binder is preferably contained in the sintered material in an amount of 5 to 50% by volume. When the binder is contained in an amount of less than 5% by volume, the sintered material may have insufficiently enhanced strength. When the binder is contained in an amount exceeding 50% by volume, the content of the cBN and that of the first material are reduced, and the cBN's characteristics and the first material's characteristics, as have been described above, tend to be difficult to obtain. The binder is more preferably contained in an amount of 10 to 30% by volume. The binder's average particle diameter and content can also be determined in the same method as the method used to determine the cBN's grain diameter and content.

The sintered material according to the present embodiment preferably has a strength of 1.5 GPa or more. This strength means a bending strength σ. In the present specification, "bending strength σ" refers to a value of a three-point bending strength as measured with a three-point bending strength measurement instrument (trade name: "AG-Xplus" manufactured by Shimadzu Corporation) with a distance of 4 mm between supporting points and a crosshead fed at 0.5 mm/min. The sintered material more preferably has a strength of 1.55 GPa or more. While a specific upper limit should not be set for the strength of the sintered material, an upper limit of 2.5 GPa or less is reasonable based on the raw material for the sintered material.

<<Method for Producing Sintered Material>>

A method for producing a sintered material according to the present embodiment comprises: agitating a raw material including at least cubic boron nitride and partially stabilized zirconia with a solid solution of alumina formed therein; and sintering the agitated raw material under a prescribed condition to obtain a sintered material.

<Agitating Raw Material>

In the step of agitating a raw material, at least cubic boron nitride and partially stabilized zirconia with a solid solution of alumina formed therein are prepared, and a raw material including them are agitated. Herein, for the cubic boron nitride, any conventionally known cubic boron nitride can be prepared that allows a sintered material including cubic boron nitride, as has been described above, to be produced.

(Preparing Partially Stabilized Zirconia with a Solid Solution of Alumina Formed Therein)

The partially stabilized zirconia with a solid solution of alumina formed therein can be produced through a step A of obtaining an amorphous hydrous zirconia with a solid solution formed therein through spray pyrolysis, and a step B of calcining the amorphous hydrous zirconia with a solid solution formed therein. This can prepare partially stabilized zirconia with a solid solution of alumina formed therein that is used in the step of agitating the raw material. As will be described hereinafter, the partially stabilized zirconia with a solid solution of alumina formed therein is crystalline zirconia ($ZrO_2$) with a solid solution of at least $Al_2O_3$ formed therein. Preferably the partially stabilized zirconia with a solid solution of alumina formed therein is pulverized after the step B to be powder.

(Step A)

In the step A, initially, a hydrate of a zirconium salt, an aluminum salt, and an yttrium salt are added to water such that aluminum (Al), zirconium (Zr), and yttrium (Y) have an atomic ratio of 30-60:40-60:1-2, and mixed together to prepare an aqueous solution of a mixture. Note that while in the present specification, other than aluminum (Al), yttrium (Y) is indicated as an example of a metal to form a solid solution in zirconia ($ZrO_2$), the metal other than Al that forms a solid solution in $ZrO_2$ is not limited thereto. Further, the atomic ratio is not limited to the above ratio, and can be adjusted, as appropriate, within a range in which an effect of the present disclosure can be obtained. Further, in the step A, the above salts can be added to water and alcohol including ethanol, an organic solvent including acetone, or the like in addition to water.

Examples of the hydrate of the zirconium salt include zirconium oxychloride ($ZrOCl_2 \cdot 8H_2O$), zirconium oxynitrate ($ZrO(NO_3)_2 \cdot 2H_2O$), and zirconium acetate ($ZrO(CH_3COO)_2$). Examples of the aluminum salt include aluminum chloride ($AlCl_3$), aluminum nitrate ($Al(NO_3)_3 \cdot 2H_2O$), and aluminum acetate ($Al_2O(CH_3COO)$). Examples of the yttrium salt include yttrium chloride ($YCl_3$), yttrium nitrate ($Y(NO_3)_3$), and yttrium acetate ($Y(CH_3COO)_3$).

Subsequently, a spray pyrolyzer (e.g., a product name (a model number) "ACP-U16-H5" manufactured by ON Sogo Denki Co., Ltd.) is used under the following conditions to atomize and furthermore, pyrolyze the aqueous solution of the mixture to obtain an amorphous hydrous zirconia with a solid solution formed therein. That is, a temperature of 500 to 1400° C. is set for spray pyrolysis and a carrier gas of argon or air is provided at a flow rate of 1 to 10 L/minute, and the aqueous solution of the mixture can thus be subjected to spray pyrolysis to obtain the amorphous hydrous zirconia with a solid solution formed therein.

(Step B)

In the step B, the amorphous hydrous zirconia with a solid solution formed therein obtained in the step A is calcined. In this way, partially stabilized zirconia with a solid solution of alumina formed therein can be obtained. The calcination can be carried out in an atmosphere of air for example at a temperature of 600 to 1400° C. and thus held for 2 to 20 hours.

For example, when amorphous hydrous zirconia with a solid solution formed therein obtained by using as a raw material an aqueous solution of a mixture of a hydrate of a zirconium salt, an aluminum salt and an yttrium salt is calcined, then, a crystalline zirconia ($ZrO_2$) with a solid solution of alumina ($Al_2O_3$) and yttria ($Y_2O_3$) formed therein can be obtained as partially stabilized zirconia with a solid solution of alumina formed therein.

<Obtaining a Sintered Material>

In the step of obtaining a sintered material, the agitated raw material including the cubic boron nitride and the partially stabilized zirconia with a solid solution of alumina formed therein is sintered under a prescribed condition to obtain the sintered material. Specifically, the agitated raw material can be sintered with a pressure of 3 to 20 GPa or less applied at a temperature of 1000 to 1700° C., and thus held for 5 to 60 minutes to obtain the sintered material.

For sintering conditions for obtaining the sintered material, a pressure of 5 to 10 GPa, a temperature of 1200 to 1400° C., and a holding time of 15 to 45 minutes are preferable. The raw material may be sintered in any method, and a hot press, ultrahigh pressure press, or the like may be employed. While the raw material is sintered more preferably in a vacuum, this is not exclusive. The raw material is preferably sintered in a furnace with a temperature increasing rate of 50 to 150° C./minute applied.

A sintered material including cubic boron nitride and a first material that is a partially stabilized $ZrO_2$ with $Al_2O_3$ dispersed therein at crystal grain boundaries and/or in crystal grains, can thus be produced. Such a sintered material has large breaking resistance, and thus enables cutting under severer conditions.

Herein, the first material included in the sintered material is obtained by sintering an agitated raw material including cubic boron nitride and partially stabilized zirconia with a solid solution of alumina formed therein in the step of obtaining the sintered material, as described above. Specifically, the first material is obtained as $Al_2O_3$ that will form a solid solution in the partially stabilized zirconia with a solid solution of alumina formed therein is dispersed in partially stabilized $ZrO_2$ at crystal grain boundaries and/or in crystal grains in the step of obtaining the sintered material.

<Partially Stabilized Zirconia with a Solid Solution of Alumina Formed Therein>

The partially stabilized zirconia with a solid solution of alumina formed therein according to the present embodiment is a partially stabilized $ZrO_2$ with a solid solution of $Al_2O_3$ formed therein. The partially stabilized zirconia with a solid solution of alumina formed therein includes 5 atomic % or more and 90 atomic % or less of Al as measured through emission spectroscopy using inductively coupled plasma as a light source. The partially stabilized zirconia with a solid solution of alumina formed therein includes 0.001% by mass or more and 0.5% by mass or less of nitrogen as measured through inert gas fusion. The partially stabilized zirconia with a solid solution of alumina formed therein is a partially stabilized $ZrO_2$ with a solid solution of at least $Al_2O_3$ formed therein. Such a partially stabilized zirconia with a solid solution of alumina formed therein can be used as a raw material for the sintered material, as has been described above, and in that case, the sintered material can have enhanced breaking resistance.

(Al Content in Partially Stabilized Zirconia with a Solid Solution of Alumina Formed Therein)

As has been described above, the partially stabilized zirconia with a solid solution of alumina formed therein includes 5 atomic % or more and 90 atomic % or less of Al as measured through inductively coupled plasma atomic emission spectroscopy (ICP-AES). Measuring an Al content through ICP-AES can be carried out in a determined method. That is, a calibration curve is prepared using an Al standard solution (with a known concentration), and a calibration curve method can be used to quantify Al.

When a sintered material is obtained by using as a raw material a partially stabilized zirconia with a solid solution of alumina formed therein with an Al content of less than 5 atomic %, the sintered material tends to no longer have large hardness, large strength and large fracture toughness as characteristics of the first material. When a sintered material is obtained by using as a raw material a partially stabilized zirconia with a solid solution of alumina formed therein with an Al content exceeding 90 atomic %, the sintered material tends to have reduced fracture toughness.

(Nitrogen Content in Partially Stabilized Zirconia with a Solid Solution of Alumina Formed Therein)

As has been described above, the partially stabilized zirconia with a solid solution of alumina formed therein includes 0.001% by mass or more and 0.5% by mass or less of nitrogen as measured through inert gas fusion. Measuring nitrogen through inert gas fusion can be carried out in a determined method. For example, a nitrogen content can be determined by introducing powder of partially stabilized zirconia with a solid solution of alumina formed therein into a carbon crucible, and quantifying NO and $NO_2$ gas generated when the powder is heated.

When measured through inert gas fusion, the partially stabilized zirconia with a solid solution of alumina formed therein preferably includes 0.003% by mass or more and 0.1% by mass or less of nitrogen, more preferably 0.005% by mass or more and 0.06% by mass or less of nitrogen. When a sintered material is obtained by using as a raw material a partially stabilized zirconia with a solid solution of alumina formed therein with a nitrogen content exceeding 0.5% by mass, the sintered material tends to have a large amount of oxygen vacancies in the first material (or partially stabilized $ZrO_2$) and thus have increased strain, and thereby tends to have reduced fracture toughness. When a sintered material is obtained by using as a raw material a partially stabilized zirconia with a solid solution of alumina formed therein with a nitrogen content of less than 0.001% by mass, the sintered material has excessive grain growth of $Al_2O_3$ in $ZrO_2$ while sintered, and the sintered material has reduced fracture toughness and thus tends to have insufficiently enhanced breaking resistance.

<Method for Producing Partially Stabilized Zirconia with a Solid Solution of Alumina Formed Therein>

As has been described above, the partially stabilized zirconia with a solid solution of alumina formed therein according to the present embodiment is produced through spray pyrolysis. For example, an aqueous solution of a mixture including a hydrate of a zirconium salt, an aluminum salt and an yttrium salt can used to obtain an amorphous hydrous zirconia with a solid solution formed therein through spray pyrolysis (step A), and the amorphous hydrous zirconia with a solid solution formed therein can be calcined to obtain partially stabilized zirconia with a solid solution of alumina formed therein (step B). In this case, the partially stabilized zirconia with a solid solution of alumina formed therein will be produced as crystalline zirconia ($ZrO_2$) with a solid solution of alumina ($Al_2O_3$) and yttria ($Y_2O_3$) formed therein.

<Effect>

When a partially stabilized zirconia with a solid solution of alumina formed therein according to the present embodiment is used as a raw material for a sintered material, the sintered material can have large breaking resistance.

(Additional Note)

The above description includes embodiments additionally noted below.

(Additional Note 1)

A sintered material comprising cubic boron nitride and a first material that is a partially stabilized $ZrO_2$ with $Al_2O_3$ dispersed therein at crystal grain boundaries and/or in crystal grains, the sintered material comprising 20% by volume or more and 80% by volume or less of the cubic boron nitride, and comprising 0.001% by mass or more and 1% by mass or less of nitrogen in the first material when the first material is measured through secondary ion mass spectrometry.

(Additional Note 2)

The sintered material according to Additional Note 1, wherein when the first material is measured through secondary ion mass spectrometry, the sintered material comprises 0.005% by mass or more and 0.3% by mass or less of nitrogen in the first material.

(Additional Note 3)

The sintered material according to Additional Note 1 or 2, wherein when the first material is measured through secondary ion mass spectrometry, the sintered material comprises 0.01% by mass or more and 0.1% by mass or less of nitrogen in the first material.

(Additional Note 4)

A partially stabilized $ZrO_2$ with a solid solution of $Al_2O_3$ formed therein, comprising 5 atomic % or more and 90 atomic % or less of Al as measured through emission spectroscopy using inductively coupled plasma as a light source, and comprising 0.001% by mass or more and 0.5% by mass or less of nitrogen as measured through inert gas fusion.

(Additional Note 5)

The partially stabilized $ZrO_2$ with a solid solution of $Al_2O_3$ formed therein according to Additional Note 4, comprising 0.003% by mass or more and 0.1% by mass or less of nitrogen as measured through inert gas fusion.

(Additional Note 6)

The partially stabilized $ZrO_2$ with a solid solution of $Al_2O_3$ formed therein according to Additional Note 4 or 5, comprising 0.005% by mass or more and 0.06% by mass or less of nitrogen as measured through inert gas fusion.

EXAMPLES

Hereinafter, the present invention will more specifically be described with reference to an example although the present invention is not limited thereto.

<<Preparing Powder of Partially Stabilized Zirconia with a Solid Solution of Alumina Formed Therein (Precursor for First Material)>>

<Powder Nos. 1 to 8 and Powder Nos. B and C>

(Step A)

Initially, zirconium oxychloride ($ZrOCl_2.8H_2O$), aluminum chloride ($AlCl_3$), and yttrium chloride ($YCl_3$) were prepared. These were mixed together and water was added thereto to allow aluminum (Al), zirconium (Zr) and yttrium (Y) to have atomic ratios shown in Table 1 to thus prepare aqueous solutions of mixtures for obtaining powder Nos. 1 to 8 and Powder Nos. B and C.

Subsequently, a spray pyrolyzer (trade name: "ACP-U16-H5" manufactured by ON Sogo Denki Co., Ltd.) was used under conditions shown in Table 1 (spray pyrolysis temperature, flow rate (L/min), and carrier gas) to atomize and furthermore, pyrolyze the aqueous solutions of mixtures. Thus, amorphous hydrous zirconias with a solid solution formed therein for obtaining powder Nos. 1 to 8 and powder Nos. B and C were obtained.

(Step B)

Further, the amorphous hydrous zirconias with a solid solution formed therein were calcined under conditions shown in Table 1 (atmospheric calcination temperature and atmospheric calcination time). In this way, powder Nos. 1 to 8 and powder Nos. B and C (partially stabilized zirconias with a solid solution of alumina formed therein as a precursor for the first material) were obtained.

The partially stabilized zirconias with a solid solution of alumina formed therein as powder Nos. 1 to 8 and powder Nos. B and C are all crystalline zirconia ($ZrO_2$) with a solid solution of alumina ($Al_2O_3$) and yttria ($Y_2O_3$) formed therein. Their average particle diameters (secondary particle diameters) were measured with a SEM (trade name (model number): "JSM-7800F" (produced by JEOL Ltd.)) to all be 1 μm.

<Powder No. A>

Instead of spray pyrolysis as described above, conventionally known coprecipitation was employed to obtain partially stabilized zirconia with a solid solution of alumina formed therein (a precursor for the first material) as powder No. A. To obtain powder No. A, an aqueous solution of a mixture of aluminum (Al), zirconium (Zr), and yttrium (Y) having an atomic ratio as shown in Table 1 was used and calcination was performed under conditions shown in Table 1. Further, the partially stabilized zirconia with a solid solution of alumina formed therein as powder No. A had an average particle diameter (or secondary particle diameter) of 1 μm, as measured with the above SEM.

<Nitrogen Content in Partially Stabilized Zirconia with a Solid Solution of Alumina Formed Therein (Precursor for First Material)>

Inert gas fusion was employed to determine nitrogen contents included in powder Nos. 1 to 8 and powder Nos. A to C. The nitrogen contents were measured through inert gas fusion, as has been described above. That is, powder Nos. 1 to 8 and powder Nos. A to C were each introduced into a carbon crucible, and a nitrogen content was determined by quantifying NO and $NO_2$ gas generated when the powder was heated. A result thereof is shown in Table 1. In Table 1, a nitrogen content in a powder is indicated as "amount of N (mass %)" in the powder. The partially stabilized zirconia with a solid solution of alumina formed therein as powder No. A is a comparative example as it has a nitrogen content exceeding 0.5% by mass.

TABLE 1

|  |  | powder No. 1 | powder No. 2 | powder No. 3 | powder No. 4 | powder No. 5 | powder No. 6 | powder No. 7 | powder No. 8 | powder No. A | powder No. B | powder No. C |
|---|---|---|---|---|---|---|---|---|---|---|---|---|
| raw material | Al (at%) | 56.8 | 39.6 | 56.8 | 39.8 | 39.8 | 56.8 | 39.6 | 39.6 | 56.3 | 56.8 | 39.6 |
|  | Zr (at%) | 42 | 58.6 | 42 | 58.6 | 58.6 | 42 | 58.6 | 58.6 | 42 | 42 | 58.6 |
|  | Y (at%) | 1.2 | 1.8 | 1.2 | 1.8 | 1.8 | 1.2 | 1.8 | 1.8 | 1.2 | 1.2 | 1.8 |

TABLE 1-continued

|  |  | powder No. 1 | powder No. 2 | powder No. 3 | powder No. 4 | powder No. 5 | powder No. 6 | powder No. 7 | powder No. 8 | powder No. A | powder No. B | powder No. C |
|---|---|---|---|---|---|---|---|---|---|---|---|---|
| synthesizing conditions | spray pyrolysis temperature | 600 | 800 | 600 | 800 | 600 | 600 | 600 | 1000 | co-precipitation | 800 | 1000 |
|  | flow rate (L/min) | 8 | 2 | 8 | 2 | 6 | 4 | 4 | 4 | — | 6 | 6 |
|  | carrier gas | Ar | atmosphere | Ar | atmosphere | Ar | atmosphere | atmosphere | atmosphere | — | atmosphere | atmosphere |
|  | atmospheric calcination temperature ° C. | 900 | 1100 | 900 | 900 | 900 | 900 | 900 | 900 | 900 | 900 | 900 |
|  | atmospheric calcination time (h) | 3 | 14 | 4 | 6 | 9 | 9 | 16 | 9 | 9 | 9 | 9 |
| amount of N in powder | amount of N in powder (mass %) | 0.001 | 0.5 | 0.003 | 0.1 | 0.005 | 0.06 | 0.09 | 0.14 | 0.6 | 0.11 | 0.24 |

<<Preparing a Sintered Material>>
<Sintered Material Nos. 1 to 8 and Sintered Material Nos. A to C>
(Agitating a Raw Material)

Powder Nos. 1 to 8 and powder Nos. A to C (average particle diameter (secondary particle diameter): 1 μm) were each mixed with commercially available cubic boron nitride (average grain diameter: 2 μm, trade name: "BN-T" manufactured by Showa Denko K.K.) so as to have compositions shown in Table 2. Thus, agitated raw materials of mixtures for obtaining sintered material Nos. 1 to 8 and sintered material Nos. A to C were prepared.

(Obtaining a Sintered Material)

The raw materials of mixtures were sintered at a temperature of 1300° C. with a pressure of 7 GPa applied, and thus held for 15 minutes to obtain sintered material Nos. 1 to 8 and sintered material Nos. A to C. These sintered materials each had a $ZrO_2$ content in the first material, as shown in Table 2, as a result of an investigation with a SEM in the above-described method. Further, a content ratio (or a composition) of the cubic boron nitride and the first material in each sintered material was investigated with a SEM in the above-described method, and it has been confirmed to match that of the cubic boron nitride and the partially stabilized zirconia with a solid solution of alumina formed therein in the raw material of the mixture.

In the present example, a sintered material produced using powder No. 1 will hereinafter be indicated as sintered material No. 1. Similarly, sintered materials produced using powder Nos. 2, 3, 4, 5, 6, 7, and 8 will hereinafter be referred to as sintered material Nos. 2, 3, 4, 5, 6, 7, and 8, respectively.

Further, sintered materials produced using powder Nos. A, B and C will hereinafter be referred to as sintered material Nos. A, B and C, respectively.

<Nitrogen Content in Sintered Material>

Secondary ion mass spectrometry (SIMS) was employed to determine nitrogen contents in sintered material Nos. 1 to 8 and sintered material Nos. A to C. The nitrogen contents were measured through secondary ion mass spectrometry (SIMS), as has been described above. A result thereof is shown in Table 2. In Table 2, a nitrogen content measured through SIMS is indicated as an "amount of N (mass %) in the first material." In comparing Tables 1 and 2, a nitrogen content in a first material may be different from a nitrogen content in a powder of partially stabilized zirconia with a solid solution of alumina formed therein because they are measured in different methods.

Note that, in Table 2, sintered material Nos. 1 to 8 are examples, and sintered material Nos. A to C are comparative examples. Sintered material No. A has a nitrogen content exceeding 1% by mass. Sintered material No. B has a cubic boron nitride content exceeding 80% by volume, and sintered material No. C has a cubic boron nitride content of less than 20% by volume.

TABLE 2

|  | sintered material No. 1 | sintered material No. 2 | sintered material No. 3 | sintered material No. 4 | sintered material No. 5 | sintered material No. 6 | sintered material No. 7 | sintered material No. 6 | sintered material No. A | sintered material No. B | sintered material No. C |
|---|---|---|---|---|---|---|---|---|---|---|---|
| cubic: boron nitride content (vol %) | 60 | 50 | 60 | 50 | 60 | 60 | 30 | 80 | 40 | 90 | 10 |
| 1st material content (vol %) | 40 | 50 | 40 | 50 | 40 | 40 | 70 | 20 | 60 | 10 | 90 |
| $ZrO_2$ content in 1st material (vol %) | 60 | 75 | 60 | 75 | 75 | 60 | 60 | 60 | 60 | 60 | 75 |
| amount of N in 1st material (mass %) | 0.001 | 1 | 0.005 | 0.3 | 0.01 | 0.1 | 0.37 | 0.55 | 1.2 | 0.45 | 0.64 |

<<Cutting Test>>

Sintered material Nos. 1 to 8 and sintered material Nos. A to C were machined to manufacture cutting tools having a shape of CNGA120408 having a negative land angle of 15° and a negative land width of 0.12 mm and use them to conduct a cutting test by high-speed cutting according to the following cutting conditions and test contents.

<Cutting Conditions>

Cutting Rate: 1200 m/min.

Feed: 0.1 mm

Cut: 0.2 mm

Wet/Dry: Wet (coolant: emulsion)

Apparatus: LB4000 (manufactured by Okuma Corporation, using a holder of EWN68-150CKB6)

Workpiece: centrifugal cast iron (shape: cylindrical (outer diameter: φ85 mm)).

<Contents of Test>

The cutting tools manufactured from sintered material Nos. 1 to 8 and sintered material Nos. A to C, as described above, were used to cut a workpiece under the above cutting conditions by 8 km, 16 km, and 24 km and how their cutting edges were worn and broken were observed.

Specifically, when a cutting tool cut the workpiece by each distance (i.e., 8 km, 16 km, and 24 km), and had a cutting edge with a breakage of less than 200 μm, it was assessed as being worn and its worn width was recorded (in μm). Further, when a cutting edge had a breakage of 200 μm or more, it was assessed as being broken and recorded accordingly. A cutting tool providing a longer cut length while the cutting tool can be assessed as being worn can be assessed as having a longer service life. A result thereof is shown in Table 3.

Thus, it is understood that the presently disclosed sintered material obtains larger breaking resistance and is thus capable of cutting under severer conditions.

Thus while embodiments and examples of the present invention have been described, it is also initially planned to combine configurations of the embodiments and examples, as appropriate.

The embodiments and examples disclosed herein are illustrative in any respects and should not be construed as being restrictive. The scope of the present invention is defined by the terms of the claims, rather than the above-described embodiments and examples, and is intended to include any modifications within the scope and meaning equivalent to the claims.

The invention claimed is:

1. A sintered material comprising cubic boron nitride and a first material that is a partially stabilized $ZrO_2$ with $Al_2O_3$ dispersed therein at crystal grain boundaries and/or in crystal grains, the sintered material comprising 20% by volume or more and 80% by volume or less of the cubic boron nitride, the sintered material comprising 20% by volume or more and 80% by volume or less of the first material, the first material comprising 5% by volume or more and 90% by volume or less of $Al_2O_3$, the sintered material comprising 0.001% by mass or more and 1% by mass or less of nitrogen in the first material when the first material is measured through secondary ion mass spectrometry.

2. The sintered material according to claim 1, wherein the sintered material comprises 0.005% by mass or more and

TABLE 3

| | sintered material No. 1 | sintered material No. 2 | sintered material No. 3 | sintered material No. 4 | sintered material No. 5 | sintered material No. 6 | sintered material No. 7 | sintered material No. 8 | sintered material No. A | sintered material No. B | sintered material No C |
|---|---|---|---|---|---|---|---|---|---|---|---|
| state of cutting edge for 8 km (μm) | 172 | 142 | 113 | 120 | 109 | 109 | 151 | 184 | broken | broken | broken |
| state of cutting edge for 16 km (μm) | broken | broken | 178 | 177 | 160 | 160 | broken | broken | broken | broken | broken |
| state of cutting edge for 24 km (μm) | broken | broken | broken | broken | 193 | 193 | broken | broken | broken | broken | broken |

<Discussions>

As shown in Table 3, the cutting tools manufactured from sintered material Nos. 1 to 8 were assessed as being worn when the cutting tools cut the workpiece by at least 8 km. In particular, the cutting tools manufactured from sintered material Nos. 5 and 6 were assessed as being worn even when the cutting tools cut the workpiece by 24 km.

On the other hand, the cutting tools manufactured from sintered material Nos. A to C were assessed as being already broken when the cutting tools cut the workpiece by 8 km.

0.3% by mass or less of nitrogen in the first material when the first material is measured through secondary ion mass spectrometry.

3. The sintered material according to claim 1, wherein the sintered material comprises 0.01% by mass or more and 0.1% by mass or less of nitrogen in the first material when the first material is measured through secondary ion mass spectrometry.

* * * * *